(No Model.)
M. F. RICHARDSON, Sr.
MOLDING FLASK.
No. 455,293. Patented June 30, 1891.
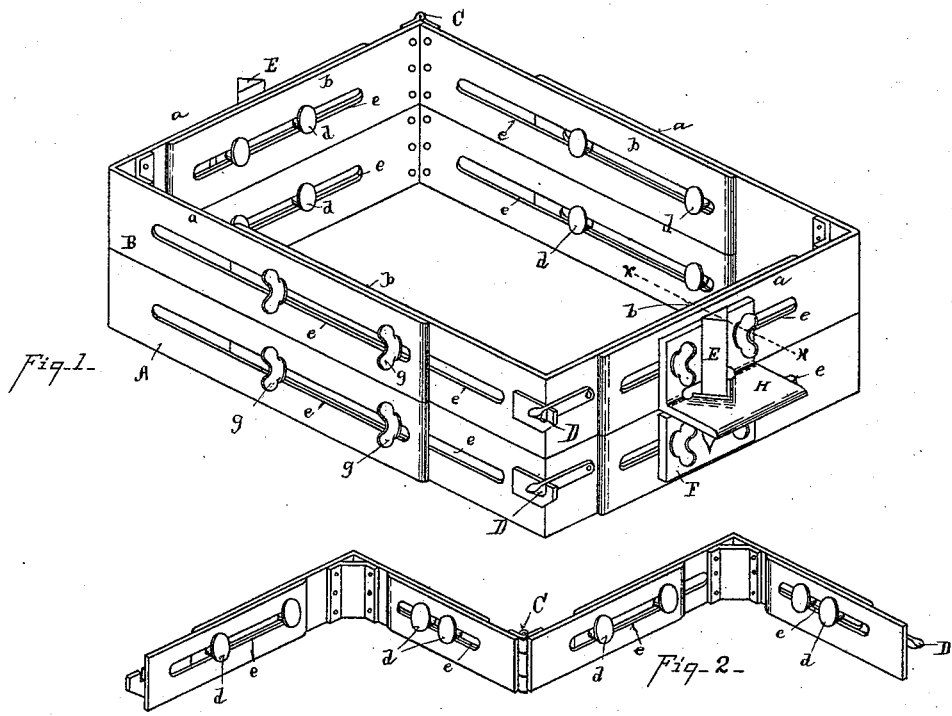
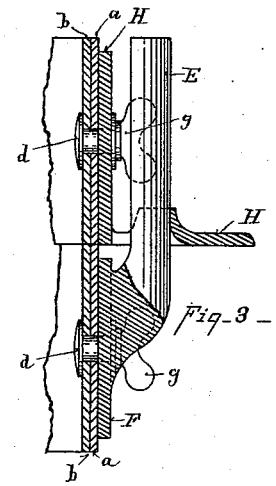
Witnesses
C. W. Miles
T. Simmons
Inventor
Millard F. Richardson Sr.
By his Attorneys Thos. S. Boyd
THE NORRIS PETERS CO., PHOTO-LITHO., WASHINGTON, D. C.

UNITED STATES PATENT OFFICE.

MILLARD F. RICHARDSON, SR., OF LIBERTY, INDIANA, ASSIGNOR OF ONE-HALF TO WILLIAM W. SNYDER AND SAMUEL W. LEONARD, OF SAME PLACE.

MOLDING-FLASK.

SPECIFICATION forming part of Letters Patent No. 455,293, dated June 30, 1891.

Application filed April 22, 1891. Serial No. 390,001. (No model.)

*To all whom it may concern:*

Be it known that I, MILLARD F. RICHARDSON, Sr., a citizen of the United States, and a resident of Liberty, in the county of Union and State of Indiana, have invented certain new and useful Improvements in Molding-Flasks, of which the following is a specification.

My invention relates to snap-flasks.

The object of the invention, primarily, is to provide a drag and cope which can be adjusted in size to suit varying sizes of patterns, so that instead of having a series of different-sized snap-flasks one flask may be adapted to be used with the varying sizes of patterns for casting.

Another object of my invention is to so construct the adjustable sections of the cope and drag that the dowel-pin may be tightened by the adjustment, so as to hold the cope rigidly in position, and take up the wear of the dowel-pin and slot, all of which will be fully set forth in the description of the accompanying drawings, making a part of this specification, in which—

Figure 1 is a perspective view of my invention. Fig. 2 is a detail view of the cope thrown open. Fig. 3 is a section on line *x x*, Fig. 1.

A represents the drag, and B the cope. Each of these sections is a counterpart of the other and made in a similar manner. Each side and end of the cope or drag is made of two sections *a b*, each section having a slot *e* and connected together by tie-bolts. These tie-bolts have a head *d* upon the inner side and a thumb-screw nut *g* tapping onto the threaded end of the bolt to draw the two sections *a b* together and clamp them in any desired position of adjustment. Each side and end of the cope and drag being made of two adjustable sections, it follows that the same may be extended or contracted by sliding the section *a* upon the section *b* whenever the thumb-nuts are slackened, thereby increasing or decreasing the dimension of the cope.

C represents a hinge uniting one corner of the cope or drag together, so that it may open out into the form shown in Fig. 2.

D represents a catch for locking the opposite corners together.

E represents a dowel-pin, which is preferably attached to the sliding plate F, through which pass the tie-bolts, so that said dowel-pin may be adjusted in the center when the drag is extended or contracted. The plate F slides to the right or left, as the case may be, to bring it into a central position. H represents a similar plate attached to the cope, with a socket or opening pierced through the same adapted to receive the dowel-pin E. I have shown this dowel as three-cornered and the orifice of a similar shape, which is the preferred form. An advantage arises in this construction of flask, in that the adjustment of the cope upon the drag tightens the dowel-pin. The sections of the cope are drawn together sufficient to take up all lost motion of the dowel-pin before the thumb-nuts are tightened, thus taking up lost motion to accommodate itself to the wear of the dowel-pin and make a firm union of the cope and drag, so that the two may be held in exact registering positions for casting the forms molded therein.

Having described my invention, what I claim is—

1. In a flask, a drag having its sides and ends each composed of longitudinally-slotted superimposed sections and tie-bolts passing through the slots of the sections and clamping the latter together, while enabling such sections to be adjusted longitudinally with relation to each other, substantially as described.

2. The combination, in a flask, of the drag and cope having their sides and ends each composed of longitudinally-slotted superimposed sections, tie-bolts passing through the slotted portions of the sections, and means for tightening the tie-bolts to clamp the sections together, substantially as described.

3. The combination of the drag A, having its sides adjustable in length, the longitudinally-adjustable plate F, carrying the dowel E, and the cope B, adjustable similarly to the drag and provided with the adjusting socket-plate H, substantially as described.

In testimony whereof I have hereunto set my hand.

MILLARD F. RICHARDSON, SR.

Witnesses:
PETER P. MAILACH,
WM. J. MCINTOSH.